July 31, 1962 J. W. RICHARDS 3,046,835
METHOD OF AND APPARATUS FOR PRODUCING
AND PHOTOGRAPHING DISPLAYS
Filed March 14, 1961 3 Sheets-Sheet 1

INVENTOR
JOSEPH W. RICHARDS

BY *Baldwin + Wight*

ATTORNEYS

July 31, 1962 J. W. RICHARDS 3,046,835
METHOD OF AND APPARATUS FOR PRODUCING
AND PHOTOGRAPHING DISPLAYS
Filed March 14, 1961 3 Sheets-Sheet 2
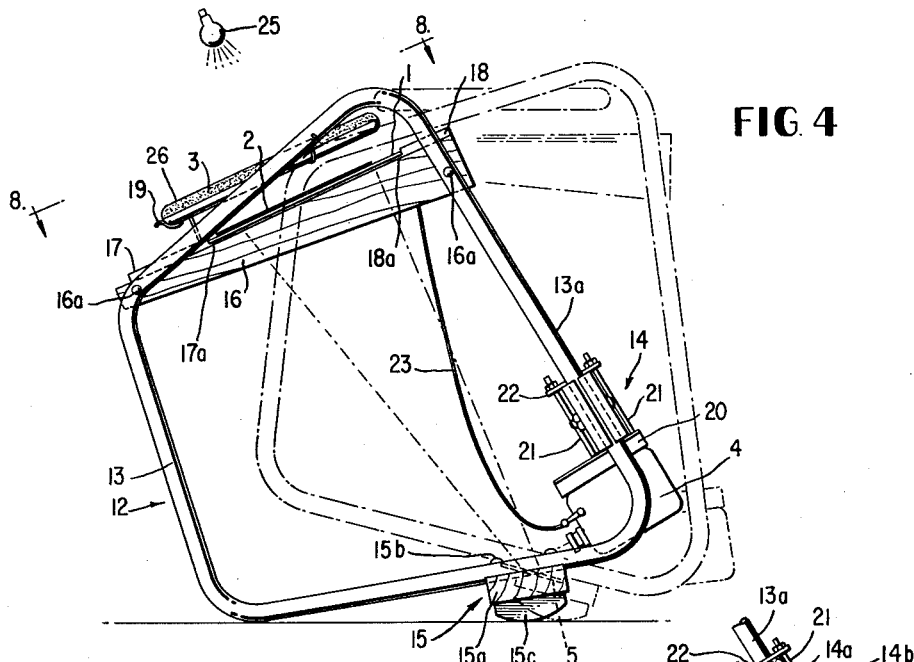
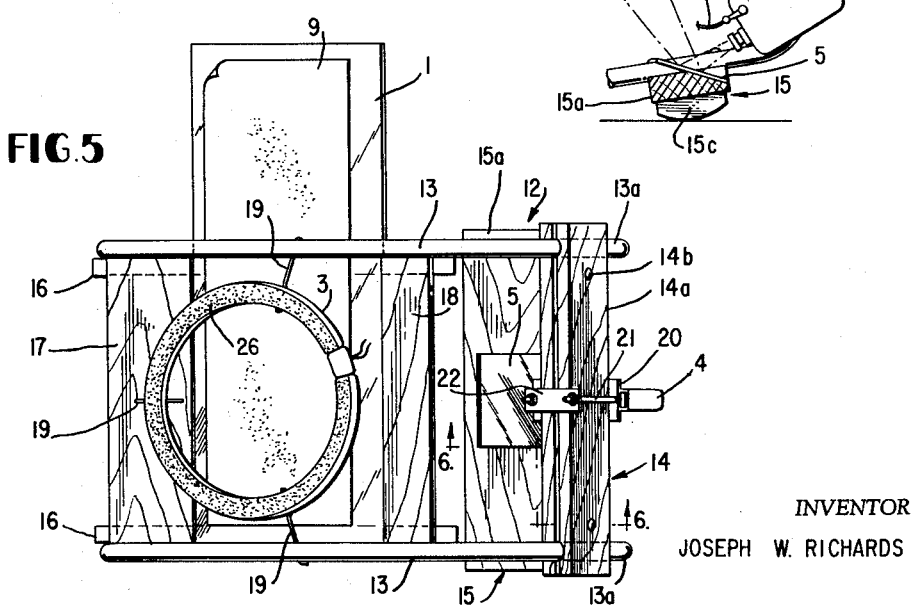
INVENTOR
JOSEPH W. RICHARDS
BY Baldwin & Wight
ATTORNEYS July 31, 1962  J. W. RICHARDS  3,046,835
METHOD OF AND APPARATUS FOR PRODUCING
AND PHOTOGRAPHING DISPLAYS
Filed March 14, 1961  3 Sheets-Sheet 3
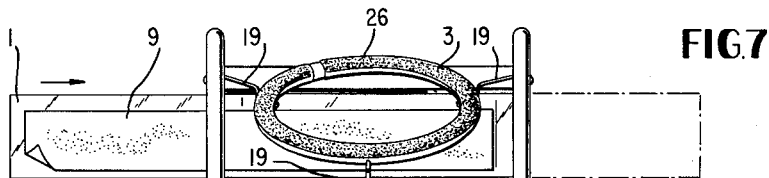
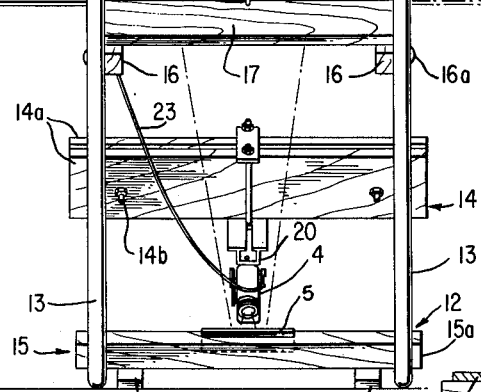
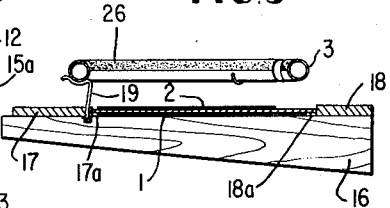
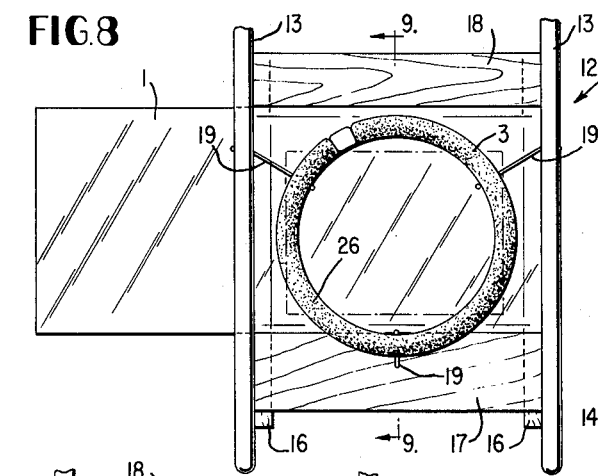
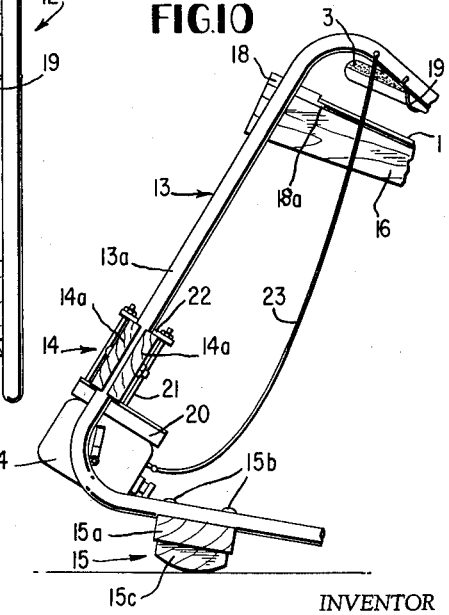
INVENTOR
JOSEPH W. RICHARDS
BY Baldwin + Wight
ATTORNEYS

United States Patent Office 3,046,835
Patented July 31, 1962

3,046,835
METHOD OF AND APPARATUS FOR PRODUCING AND PHOTOGRAPHING DISPLAYS
Joseph W. Richards, Key Biscayne, Fla., assignor to Fels & Co., Philadelphia, Pa., a corporation of Pennsylvania
Filed Mar. 14, 1961, Ser. No. 95,637
8 Claims. (Cl. 88—24)

This invention relates to methods of and apparatus for producing and photographing displays, especially displays of drawings or writings in the process of being drawn or written, and displays of objects, silhouettes and other representations, both while stationary and while moving.

In one sense, the invention is somewhat related to the production of so called animated motion pictures, but only to the extent that the displays are artificially produced and photographed, as distinguished from the taking of ordinary motion pictures of live subjects or natural scenes. In the usual production of animated motion pictures, many, sometimes thousands, of individual displays are laboriously drawn or otherwise produced, each successive display showing the same subject as the preceding display, but in a slightly different position. The displays are photographed in sequence, and when successively projected or viewed, will depict apparent movement of the subject, more or less jerky, depending upon the smallness of degree of differences in positions of the successively photographed individual displays.

It has previously been proposed to produce and photograph displays, including moving displays, by placing an opaque display object or marking on a translucent sheet, illuminating the sheet on the side thereof opposite the side on which the display object or marking is placed, and photographing the image of the object or marking reflected back through the sheet. A difficulty with such methods is that shadows and incidental halations result from the proximity of the artist's or scrivener's hand to the translucent sheet. Attempts to overcome this difficulty have included the wearing of black gloves by the artist, scrivener or operator.

An object of the present invention is to provide an improved method of producing and photographing displays, particularly moving displays, or writings or drawings in process, characterized by smoothness and rhythm, as distinguished from the relative lack of rhythm and grace of the "scratch-off" type of animated movies, and by substantial elimination of shadow effects and incidental halations which have caused difficulty in the prior art methods referred to above.

More particularly, an object of the invention is to illuminate the working surface of a translucent sheet marginally from the working surface side of the sheet, in such manner as to provide a border of illumination surrounding the viewing area, the light source being so positioned and the light being so diffused as substantially completely to prevent shadows or halations which otherwise would be caused by objects, for example an operator's hand or drawing instrument, on the working surface side of the sheet.

Another object of the invention is to provide a simple, inexpensive and improved apparatus for use in practicing methods according to the invention.

Further objects will become apparent from a reading of the following description, the appended claims, and the accompanying drawings, in which:

FIGURE 4 is a side elevational view of one constructional form of apparatus embodying the invention;

FIGURE 5 is a top plan view of the apparatus shown in FIGURE 4;

FIGURE 6 is a fragmentary detail sectional view on the line 6—6 of FIGURE 5;

FIGURE 7 is a front elevational view of the apparatus as viewed from the left of FIGURE 4;

FIGURE 8 is a top view of the apparatus, viewed somewhat at an inclination to the vertical, and as indicated by the arrows 8—8 in FIGURE 4;

FIGURE 9 is a detail sectional view on the line 9—9 of FIGURE 8;

FIGURE 10 is a fragmentary side elevational view of the rear part of the apparatus, showing a camera mounting means and camera control cord; and FIGURE 11 is a top view of a translucent sheet modified to equalize the transmission of light, portions of the supporting frame being shown partly in plan and partly in section.

Figure 1:
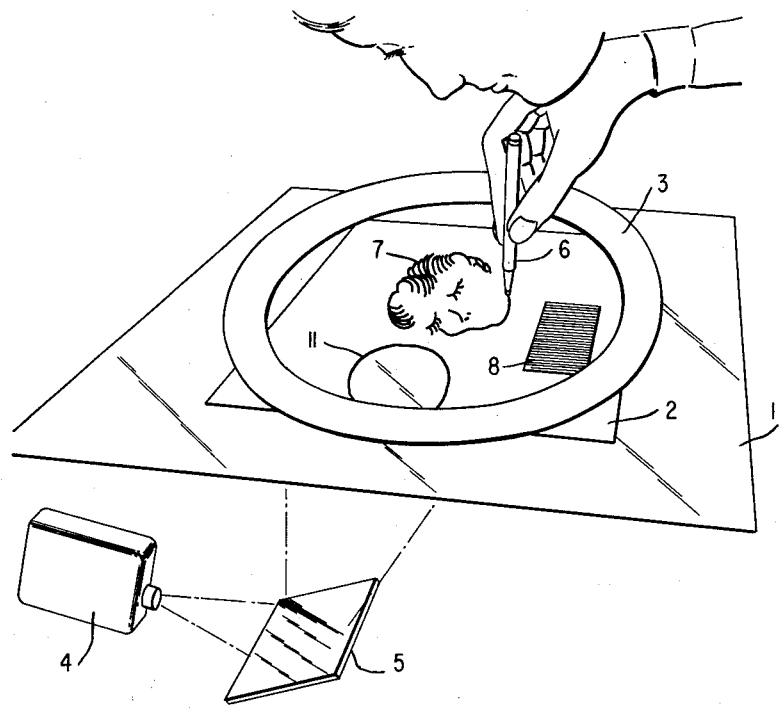
FIGURE 1 is a schematic view of apparatus components arranged in accordance with the invention and adapted for use in practicing the method of producing and photographing displays, according to the invention.

The basic principles of apparatuses and methods according to the invention may be understood by reference to FIGURE 1, which shows an art plane member 1 of strong transparent material, preferably clear glass or equivalently transparent material serving to support a translucent sheet 2 of tracing paper or other sheet material having substantially equivalent light transmitting characteristics. A source of illumination 3 is positioned on one, the working or top surface, side of the sheet 2 and is of such form as to produce a border of source illumination extending generally about the margin of the sheet 2 and adjacent to the top or working surface of the sheet. Preferably, the illumination source 3 is continuous or substantially so, that is in the general form of a loop, and may conveniently be provided by a circular or otherwise generally looped form fluorescent lamp tube. The light source 3 is spaced above the working surface of the sheet 2, preferably about three inches.

A camera 4, which may be either a motion picture camera or a television camera, is positioned to photograph the image of a display on the sheet 2 as defined by light transmitted from the light source 3 through the sheet 2, partially interrupted by the display. Importantly, the sheet 2 is positioned between the light source and the camera, the working surface of the sheet facing the light source. The camera 4 may be mounted upside down and the light transmitted through the sheet 2 preferably is caused to strike a mirror 5 and be reflected by the latter to the camera so as to avoid vertical and horizontal or right-to-left reversals of the image.

In accordance with the invention, light from the border or marginal source 3 close to but spaced above the working surface of the sheet 2, is partially interrupted in passing through the sheet by producing an opacity on the sheet or rendering a portion or portions of the sheet at least relatively opaque with the result that the opacity or relative opacities will be photographed as images by the camera 4. The opacities may be provided or created in various ways to form many kinds of displays. As shown in FIGURE 1, an artist using a wick pen or brush 6 is in the act of drawing a human face indicated at 7. The drawing 7 itself is, of course, relatively opaque as compared to the sheet 2, and will interrupt partially or modify light passing through the sheet to the camera. It has been found that because of the relative positioning of the parts, especially the location of the border of illumination extending around the margin of the sheet 2 and spaced slightly thereabove, and the drawing of the picture 7 within the border of light results in the photographing of a clear image of the display 7 substantially completely free of shadows and incidental halations. The pen or brush 6 and the operator's hand are effectively eliminated from the image transmitted to the camera 4, with the result that the process of art or act of drawing the display may appear to the viewer as being mysterious, as by an unseen hand, or at least as challenging the imagination. Furthermore, this engaging and desirable effect is obtained without resorting to the tedious and expensive conventional procedure of drawing multitudinous separate pictures, each showing a small increment of drawing progression from the preceding one, and then separately photographing each of the individual drawings. When writing, instead of drawing a picture, the mirror 5 eliminates the necessity of writing backwards to produce the desired progressing view of the word being written from left to right.

Figure 2:
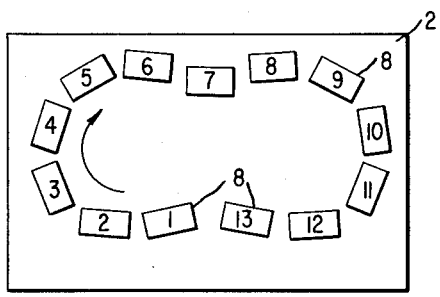
FIGURE 2 is a diagrammatic representation depicting the production of a moving display by moving an opaque object over the working surface of a transparent sheet.

The flexibility of the apparatus and methods in enabling the production and photographing of different displays may be appreciated by further considering FIGURES 1 and 2 in connection with an opaque display object or "logo" 8, for simplicity shown as a rectangle of opaque sheet material loosely lying on the transparent sheet 2. The object 8, of course, partially interrupts, or interrupts part of the light passing through the sheet so that an image of the object may be photographed in any position of the object on the sheet. The display 8 may be moved to produce various effects, as for example by pushing it with the finger or a stylus or the like to the positions indicated successively at "1" to "13" in FIGURE 2, the camera photographing the object in motion over a selected path in the nature of a border which might, for example, surround the previously drawn face 7 or written or printed matter, also opaque or partially so. Another use would be to place a succession of objects, all like the object 8, progressively in the positions shown at "1" to "13" in FIGURE 2, leaving each of the objects in its position so as to produce a continuous and finally static border effect. Because of the positioning of the border source of illumination as shown in FIGURE 1 and described above, the manipulation or placement of the articles 8 may be accomplished manually without the operator's hand having any effect upon the display as photographed.

Further, the object 8 may have the form of, say, a human figure, or animal or vehicle which may be moved over the transparent sheet 2 to produce a moving display in the nature of so called animated motion picture displays.

Figure 3:
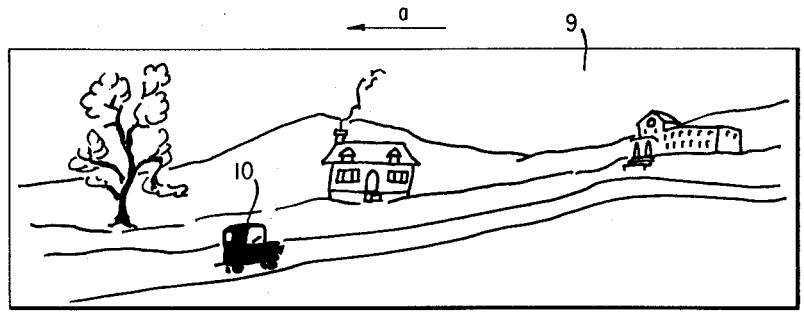
FIGURE 3 is a plan view of an elongated translucent sheet provided with a background of varying opacities to illustrate a scene, and an opaque object, as shown a cutout representation of an automobile, superimposed upon the background representation.

An elongated transparent sheet 9, again of tracing paper or equivalent material, is painted, drawn, or otherwise treated, as shown in FIGURE 3, to provide varying opacities so as to provide a scene or background. The sheet 9 may be placed on an art plane such as the glass sheet 1 in FIGURE 1, but elongated, and moved in the plane of the sheet 9 and in the direction of the arrow a in FIGURE 3 so as progressively to bring different portions of the background scene into the viewing area generally encompassed by the border source of illumination. While the sheet 9 is being so moved, with the camera 4 running, the effect will be to photograph different parts of the scene as though the camera were being moved along.

The scene depicted on the sheet 9 includes a road, a tree, hills, a house, and a schoolhouse. A logo 10 in the form of an automobile silhouette is shown superimposed on the road as though driving toward the schoolhouse. By moving the sheet 9 in the direction of the arrow while maintaining the logo 10 within the viewing area, the automobile will be photographed as rolling toward the schoolhouse.

While the sheet 9 is being moved to show the changing view and the progress of the automobile along the road, the logo 10 may be shifted transversely to the direction of movement of the sheet, but maintained within the viewing area, so as to be kept on the road, so to speak. Logos of other shapes may be moved within the viewing area concurrently with movement of the sheet to create various effects.

Increased interest of viewers may be obtained by modifying the translucent sheet 2 in a manner to permit an object on the working side of the sheet and beyond the source of illumination to be photographed within a limited part of the viewing area. As shown in FIGURE 1, the sheet 2 is rendered transparent within a limited portion of the viewing area by forming a cutout 11. Light emanating from the source 3 and reaching the object above the source, say for example the operator's or artist's face or a portion thereof, will be reflected back so as to pass through the transparent or cutout portion 11 without being substantially modified or interrupted by the sheet 2. In this way, the process of art, i.e. the drawing of the face 7, and the artist's own face will be viewed by the camera simultaneously, the artist's face appearing in an insert in the total picture.

Various forms of construction may be used for supporting the essential elements in the important relationship described above. In the construction shown in FIGURES 4–11, a frame, generally designated 12, includes two trapeziform side members 13 of tubular metal, a rear cross connector structure 14, a bottom cross connector structure 15, are table supports 16 at the sides and near the top of the frame 12, and front and rear top panels 17 and 18.

The rear cross connector 14 is conveniently formed of two strips 14a of light material, for example wood, placed respectively in front of and behind the two rear legs 13a of the members 13, the strips 14a being clamped against the legs 13a by bolts 14b.

The bottom cross connector structure 15 is constituted by a strip 15a of wood secured to the bottoms of the side members 13 by bolts 15b. The strip 15a may be provided with feet 15c rounded on their bottoms to facilitate tipping the entire frame construction as may be required or found convenient by the operator.

The art table supports 16 are secured respectively to and inside the frame members 13 by bolts 16a, and provide mountings for the front and rear transverse panels 17 and 18. These panels are rabbeted as shown at 17a and 18a so as to provide seats for the glass plate 1 shown in FIGURE 1, or an elongated glass plate for use in supporting an elongated translucent sheet 9 as shown in FIGURE 3. FIGURE 11 shows the construction including the short or glass panel 1 of FIGURE 1, and FIGURES 5, 7 and 8 show the construction as including the elongated glass panel. FIGURES 4, 9 and 10 show the mounting of either the short or the long glass panel. In either case, the rabbeted portions 17a and 18a provide tracks or guideways on which the glass panel may be slid either for insertion and removal, or for producing the moving background scene effect.

The fluorescent tube lamp 3 is supported just slightly above, say approximately three inches above, the translucent sheet 2 by wire finger supports 19, the arrangement being such that the lamp 3 may easily be lifted off the supporting fingers when desired.

In the illustrative constructional embodiment, the mirror 5 is mounted in a recessed part of the bottom strip 15a as most clearly shown in FIGURES 4 and 6. The camera 4 is mounted on the frame through the medium of a supporting bar 20 fixed to the camera housing and secured to the rear cross connector structure 14 by bolts 21 and a clamping plate 22. The camera may be adjusted generally vertically by releasing the clamping bolts 14b and sliding the back structure 14 up or down on the rear legs 13a; and may be adjusted horizontally across the frame by releasing the clamping bolts 21 and sliding the camera along the rear connector structure 14. Generally, these adjustments of the camera will be sufficient; but if further adjustment of the parts is required in special instances, the position of the mirror 5 on the bottom connector 15 may be changed by any suitable adjusting means.

To enable the operator or artist to control the camera conveniently while producing displays, as while drawing the face 7, a trigger cord 23 is attached to one of the art table supports 16 and is extended down to the control finger on the camera.

In the modification shown in FIGURE 11, the translucent sheet 2 is provided, principally adjacent its corners and ends, with marginal portions closest to the lamp 3 which are less translucent, that is more nearly but not completely opaque, than the inner portion of the sheet, more toward the center of the viewing area. As indicated by the stippling in FIGURE 11, the marginal portions increase gradually in translucency from outside to inside, and die out into the main translucent sheet portion or major part of the sheet within the viewing area.

As indicating the great flexibility of the apparatus and method in producing and photographing many different kinds of displays, reference is made to one further example. As shown in FIGURE 4, a concentrated or spot source of light, for example an ordinary incandescent light bulb 25, may be held a considerable distance above the translucent sheet 2 and the border source of illumination 3 so as not to be effectively transmitted through the sheet 2 to the camera. At an appropriate time, as for example when completing the writing of an advertisement in the viewing area, the spot light 25 may be moved rapidly toward the sheet 2 so as to produce an expanding and brilliant flash of light intended to impress the viewer.

Preferably, the upper surface of the border illuminating lamp 3 is shielded, as by being covered with a dark coating, as shown at 26, to prevent transmission of light directly upwardly, that is away from the working surface of the sheet 2. Diffusion of light where it is needed, and substantially only there, is thus improved. A further advantage is that of protecting the operator's or user's eyes from the light.

The method and apparatus described are representative of methods and apparatuses according to the invention, but it is intended that the disclosure be illustrative rather than definitive, the invention being defined in the claims.

I claim:

1. In a method of making and photographing displays, the steps of producing a relatively opaque display on one, the working, surface of a translucent sheet; producing a border of source illumination extending generally about the margin of said sheet and at and adjacent to said working surface but entirely on the working surface side of said sheet so that said working surface is between said source illumination and the other side of said sheet and light from said source illumination will be transmitted into and through said sheet only from said working surface side of said sheet; and photographing, with a camera, the image of said display as defined by light transmitted from said source illumination through said sheet, partially interrupted by said display.

2. In a method of making and photographing displays, the steps of producing a relatively opaque display on one, the working, surface of a translucent sheet; producing a substantially continuous border of source illumination extending generally about the margin of said sheet and at and adjacent to said working surface but entirely on the working surface side of said sheet so that said working surface is between said source illumination and the other side of said sheet and light from said source illumination will be transmitted into and through said sheet only from said working surface side of said sheet; and photographing, with a camera, the image of said display as defined by light transmitted from said source illumination through said sheet, partially interrupted by said display.

3. In a method of making and photographing displays, the steps of producing a relatively opaque display on one, the working, surface of a translucent sheet; producing a border of source illumination extending generally about the margin of said sheet and at and adjacent to said working surface but entirely on the working surface side of said sheet so that said working surface is between said source of illumination and the other side of said sheet and light from said source illumination will be transmitted into and through said sheet only from said working surface side of said sheet; moving a spot light source from a position at and substantially spaced from the working surface side of said sheet toward the sheet area encompassed by said border source of illumination; and photographing, with a camera, both the image of said display as defined by light transmitted from said border source of illumination through said sheet, partially interrupted by said display, and the spot light source as it approaches said sheet.

4. In apparatus for producing and photographing displays, a translucent sheet; means for supporting said sheet; a source of illumination at one, the working surface, side of said sheet, extending marginally around a viewing area portion of said sheet and being disposed entirely on said working surface side of said sheet whereby light from said source will be transmitted into and through said sheet only from said working surface side of said sheet; a camera positioned to photograph the viewing area portion of said sheet from the other side thereof; and means for producing a relatively opaque display on said working surface of said sheet within the viewing area portion thereof, whereby partially to interrupt light passing from said source through the viewing area portion of said sheet and to said camera.

5. In apparatus for producing and photographing displays, a translucent sheet; means for supporting said sheet; a source of illumination entirely at one, the working surface, side of said sheet close to but spaced from said working surface and extending marginally around a viewing area portion of said sheet whereby light from said source of illumination will be transmitted into and through said sheet only from said working surface side of said sheet; a camera positioned to photograph the viewing area portion of said sheet from the other side thereof; and means for producing a relatively opaque display on said working surface of said sheet within the viewing portion thereof, whereby partially to interrupt light passing from said source through the viewing area portion of said sheet and to said camera.

6. In apparatus for producing and photographing displays, a translucent sheet; means for supporting said sheet; a fluorescent tube lamp entirely at one, the working surface, side of said sheet and being formed generally as a loop and extending marginally around a viewing area portion of said sheet whereby light from said lamp will be transmitted into and through said sheet only from said working surface side of said sheet; a camera positioned to photograph the viewing area portion of said sheet from the other side thereof; and means for producing a relatively opaque display on said working surface of said sheet within the viewing area portion thereof, whereby partially to interrupt light passing from said lamp through the viewing area portion of said sheet and to said camera.

7. In apparatus for producing and photographing displays, a translucent sheet; means for supporting said sheet; a fluorescent tube lamp entirely at one, the working surface, side of said sheet, being formed generally as a loop, being in a plane substantially parallel to the plane of said sheet, being spaced about three inches from said sheet and extending marginally around a viewing area portion of said sheet whereby light from said lamp will be transmitted into and through said sheet only from said working surface side of said sheet; a camera positioned to photograph the viewing area portion of said sheet from the other side thereof; and means for producing a relatively opaque display on said working surface of said sheet within the viewing area portion thereof, whereby partially to interrupt light passing from said lamp through the viewing area portion of said sheet and to said camera.

8. In apparatus for producing and photographing displays, a translucent sheet; means for supporting said sheet; a fluorescent tube lamp entirely at one, the working surface, side of said sheet and being formed generally as a loop and extending marginally around a viewing area portion of said sheet whereby light from said lamp will be transmitted into and through said sheet only from said working surface side of said sheet, marginal portions of said sheet closest to said lamp being less translucent, that is more nearly but not completely opaque, than the inner portion of said sheet within said viewing area; a camera positioned to photograph the viewing area portion of said sheet from the other side thereof; and means for producing a relatively opaque display on said working surface of said sheet within the viewing area portion thereof, whereby partially to interrupt light passing from said lamp through the viewing area portion of said sheet and to said camera.

References Cited in the file of this patent

UNITED STATES PATENTS

| | | |
|---|---|---|
| 1,250,412 | Anderson | Dec. 18, 1917 |
| 1,490,302 | Wilson | Apr. 15, 1924 |
| 1,633,547 | Hurd | June 21, 1927 |
| 2,394,225 | Ashford | Feb. 5, 1946 |
| 2,853,701 | Freedman et al. | Sept. 23, 1958 |

FOREIGN PATENTS

| | | |
|---|---|---|
| 569,665 | Germany | Feb. 6, 1933 |